(12) United States Patent
Liao et al.

(10) Patent No.: US 8,768,907 B2
(45) Date of Patent: *Jul. 1, 2014

(54) RANKING SEARCH ENGINE RESULTS

(75) Inventors: Lennon Liao, San Mateo, CA (US);
Jimmy Yu, Foster City, CA (US);
Sammy Yu, San Mateo, CA (US);
Lemuel Park, Cerritos, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/440,863

(22) Filed: Apr. 5, 2012

(65) Prior Publication Data

US 2013/0268504 A1     Oct. 10, 2013

(51) Int. Cl.
*G06F 17/30*    (2006.01)

(52) U.S. Cl.
USPC .......................................................... 707/706

(58) Field of Classification Search
USPC ................... 707/706, 723, 748, 752
See application file for complete search history.

(56) References Cited

U.S. PATENT DOCUMENTS

| | | | |
|---|---|---|---|
| 7,877,392 B2 * | 1/2011 | Grieselhuber et al. | 707/748 |
| 8,364,529 B1 * | 1/2013 | Zwicky et al. | 705/14.4 |
| 2005/0289140 A1 | 12/2005 | Ford et al. | |
| 2007/0208704 A1 * | 9/2007 | Ives | 707/3 |
| 2008/0071767 A1 * | 3/2008 | Grieselhuber et al. | 707/5 |
| 2008/0077556 A1 * | 3/2008 | Muriente | 707/2 |
| 2008/0172422 A1 * | 7/2008 | Li et al. | 707/202 |
| 2008/0208815 A1 | 8/2008 | Taylor | |
| 2008/0250105 A1 | 10/2008 | Grois | |
| 2009/0006311 A1 * | 1/2009 | Ting et al. | 707/2 |
| 2010/0076847 A1 * | 3/2010 | Heller | 705/14.53 |
| 2012/0166413 A1 * | 6/2012 | LeBaron | 707/709 |

* cited by examiner

*Primary Examiner* — Cam-Linh Nguyen
(74) *Attorney, Agent, or Firm* — Maschoff Brennan

(57) ABSTRACT

A method of determining search engine rank for digital content. The method may include performing a search for digital content on a network using a search term to obtain search results. The method may also include obtaining search engine optimization data from the search results and analyzing the search engine optimization data to determine a position of digital content related to an entity with respect to non-category specific search results and sub-links of non-category specific search results.

26 Claims, 7 Drawing Sheets

SEARCH TERM DETAILS

Tracked Search Term

Week: Mar 04, 2012 To Mar 10, 2012

| Search Term | First Position | First Position Change | Second Position | Second Position Change | SERP Page Number | Category | Page | Search Volume |
|---|---|---|---|---|---|---|---|---|
| Cake Shop | - | - | 5 | No Change | 1 | ◉ | [P] http://www.fansedge.com/a | 11,000 |
| Bread Sticks | 9 | No Change | 10 | No Change | 1 | 🖼 | [P] http://www.fansedge.com/bread | 1,500 |
| Frying Pan | - | - | 12 | 1▲ | 1 | 💳 | http://www.fansedge.com/stick | 11,000 |
| Glass Bowls | 17 | No Change | 17 | No Change | 2 | 📄 | http://www.fansedge.com/bowl/ | 400 |

Fig. 5

RANKING SEARCH ENGINE RESULTS

BACKGROUND

Search engine optimization (SEO) generally describes the use of computing systems for running computing processes that collect, store and analyze search engine data in order to provide recommendations to improve visibility of a website or a webpage in search engines. Search engine result may be obtained by various search strategies, such as natural, unpaid, organic, or algorithmic search results as well as for paid search algorithms of search engine marketing (SEM) target paid listings. Generally, the higher a website is located on a website listing and the more frequently a website appears in the search results list, the more visitors it will receive from the search engine's users. An entity may target different kinds of search results besides strictly website results for SEO. For example, universal results, such as images, location, videos, news, and other industry-specific vertical search results may be optimized for search engines. SEO may improve the availability of digital content, such as a website or webpage, to internet users.

SEO is implemented by Internet Technology (IT) professionals to improve the volume and quality of traffic to digital content on a network. Typical techniques include keywords in title tags, keywords in meta tags, keywords in body text, anchor text in inbound links, age of site, site structure, link popularity in a site's internal link structure, amount of indexable text/page content, number of links to a site, popularity/relevance of links to site and topical relevance of inbound link tags, any of which may include SEO data. Additional techniques are sometimes employed based on the search engine for which the webmaster is attempting to optimize. Since search engine algorithms and metrics are proprietary, SEO techniques are widely used to improve visibility of a webpage or other online data on search engine result pages.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method of determining search engine rank for digital content is disclosed. The method may include performing a search for digital content on a network using a search term to obtain search results. The method may also include obtaining search engine optimization data from the search results and analyzing the search engine optimization data to determine a position of digital content related to an entity with respect to non-category specific search results and sub-links of non-category specific search results.

A computer readable medium encoded with a computer program having computer-executable instructions for causing a computing system to determine search engine rank for digital content is disclosed. The operations may include performing a search for digital content on a network using a search term to obtain search results. The operations may also include obtaining search engine optimization data from the search results and analyzing the search engine optimization data to determine a position of digital content related to an entity with respect to non-category specific search results and sub-links of non-category specific search results.

A method of determining search engine rank for digital content is disclosed. The method may include performing a search for digital content on a network using a search term to obtain search results. The method may also include obtaining search engine optimization data from the search results. The method may also include analyzing the search engine optimization data to determine a first position of digital content related to an entity with respect to a subset of the search results and analyzing the search engine optimization data to determine a second position of the digital content related to the entity with respect to the search results.

These and other aspects of example embodiments of the invention will become more fully apparent from the following description and appended claims.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates an example of a screen shot of a dashboard; and

DETAILED DESCRIPTION

Figure 1A:
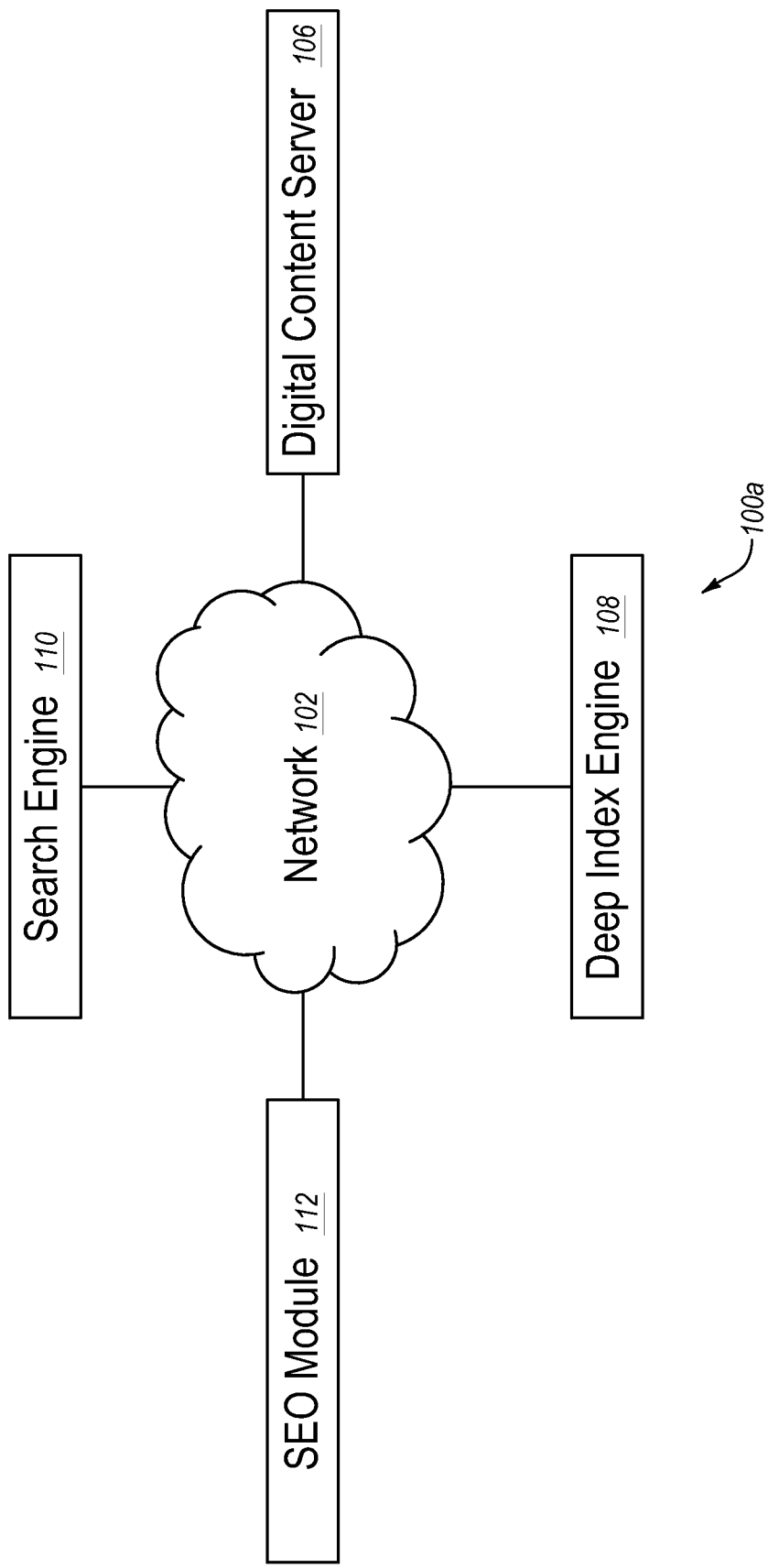
FIG. 1A is a block diagram of an example SEO system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Generally, embodiments disclosed herein relate to computing systems and computing processes used in methods of determining search engine rank for digital content generated by a category independent search. A category independent search is any search that is not confined to search a specific category of results but is able to provide all results that best match the query. A category independent search by a search engine may return search results that include non-category specific digital content as well as category specific digital content, such as images, videos, news, shopping, realtime, blogs, books, places, discussions, recipes, patents, calculator, stock, timelines, and other digital content that is closely related and directed toward a certain type of digital content so as to be in a category of digital content. For example, in response to a query for soccer cleats, a search engine may provide digital content relevant to soccer cleats as well as images of soccer cleats, videos regarding soccer cleats, recent news on soccer cleats, specific soccer cleats that are available for sale (shopping), blogs discussing soccer cleats, books on soccer cleats, places that sell soccer cleats or where soccer cleats may be used, patents on soccer cleats, stock of companies that sell soccer cleats, among other digital content. These category specific results provide entities with additional ways to have their products and services listed on a search engine result page, which increases the possibility for the entities to achieve a greater online presence and expand their brand recognition. Furthermore, the additional products and service listings may be linked to an entity's digital content and thereby provide additional opportunities for digital content of an entity to obtain targeted visitors.

A category independent search by a search engine may also return search results that include sub-links to non-category specific digital content. A sub-link may be a link to a specific section of a non-category specific webpage, a webpage of a non-category specific website, or some other link to a portion of non-category specific digital content. For example, a landing page for a website for a bank may appear as a search result. Associated with the website of the bank may be sub-links to specific sections of the bank's website. For example, the sub-links may be to sections of the bank's website that discuss mortgages, checking, savings, online banking, calculators, or other sections of the bank's website. These sub-links may be positioned and/or associated with the appearance of the bank's website on the search engine result page so that they are readily understood as being sub-links of the bank's website. These sub-links provide an additional link on a search engine result page for an entity to obtain additional traffic to digital content associated with the entity. In some embodiments, the sub-links may be referred to as site-links.

Understanding how digital content of an entity ranks on a search engine result page with respect to non-category specific search results, category specific search results, and sub-links of non-category specific search results, may allow for better search engine optimization (SEO) of the digital content of the entity. Determining the rank of digital content may include performing a search for digital content on a network using a search term to obtain search results, obtaining search engine optimization data from the search results, and analyzing the search engine optimization data to determine a position of digital content related to an entity with respect to non-category specific search results, sub-links of non-category specific search results, and category specific search results. It should be understood that an entity may be a corporation, company, partnership, firm, organization, foundation, individual, trust, family, or otherwise that have digital content on the Internet.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1A is a block diagram of an example SEO system 100a, arranged in accordance with at least some embodiments described herein. The SEO system 100a may include a network 102. In some embodiments, the network 102 may be used to connect the various parts of the system 100a to one another, such as between a digital content server 106, a deep index engine 108, a search engine 110, and a SEO module 112. It will be appreciated that while these components are shown as separate, the components may be combined as desired. Further, while one of each component is illustrated, the system 100a may optionally include any number of each of the illustrated components.

The network 102 may include the Internet, which may include a global internet formed by logical and physical connections between multiple wide area networks and/or local area networks and may optionally include the World Wide Web ("Web"), that may include a system of interlinked hypertext documents accessed via the Internet. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The digital content server 106 may include any system capable of storing and transmitting digital content, such as webpages and other digital content. The digital content server 106 may provide access to digital content on the web that may be analyzed for improving SEO. For example, the digital content server 106 may include a computer program that is responsible for accepting requests from clients (user agents such as web browsers), and serving them HTTP responses along with optional data content, which may include HTML documents and linked objects for display to a user. Alternately or additionally, the digital content server 106 may include the capability of logging some detailed information, about client requests and server response, to log files.

Digital content may include a website, webpages, blogs, microblogs, posts, videos, images, e-mail, chat, and all other content that may be indexed and available over a network, such as the network 102. The aggregation of references to digital content may be referred to as traffic.

The deep index engine 108 may be configured to crawl search results on a search result page resulting from a search performed for digital content on a network. In particular, the deep index engine 108 may be configured to crawl a search result page to obtain SEO data from the search results (i.e. digital content) on the search result page and analyze the SEO data associated with the crawl, including pixel position of the digital content and other information related to the digital content.

The deep index engine 108 may be further configured to identify a position of digital content related to an entity with respect to the search results that produced the digital content or to a subset of the search results that produced the digital content. The relative position of the digital content within the search result may illustrate a rank for the digital content within the search results.

The deep index engine 108 according to some embodiments is described in more detail in copending U.S. patent application Ser. No. 12/436,704 entitled COLLECTING AND SCORING ONLINE REFERENCES, filed May 6, 2009, which application is hereby incorporated by reference in its entirety. The functionalities described herein may be applied to determining search engine rank for digital content.

The search engine 110 may be an internal or private search engine that is used for the function of producing search results that may include non-category specific search results, such as websites, sub-links of non-category specific search results, and category specific search results, such as images, videos, news, shopping, realtime, blogs, books, places, discussions, recipes, patents, calculators, stocks, timelines, and others. The search engine 110 may also be a public search engine or commercial search engine, such as those search engines of Bing, Google, Yahoo, or the like.

The SEO module 112 is configured for orchestrating and performing the analysis of the search results as described herein so that recommendations may be made to improve the digital content listed in the search results or other digital content. The SEO module 112 is described in more detail herein.

Figure 1B:
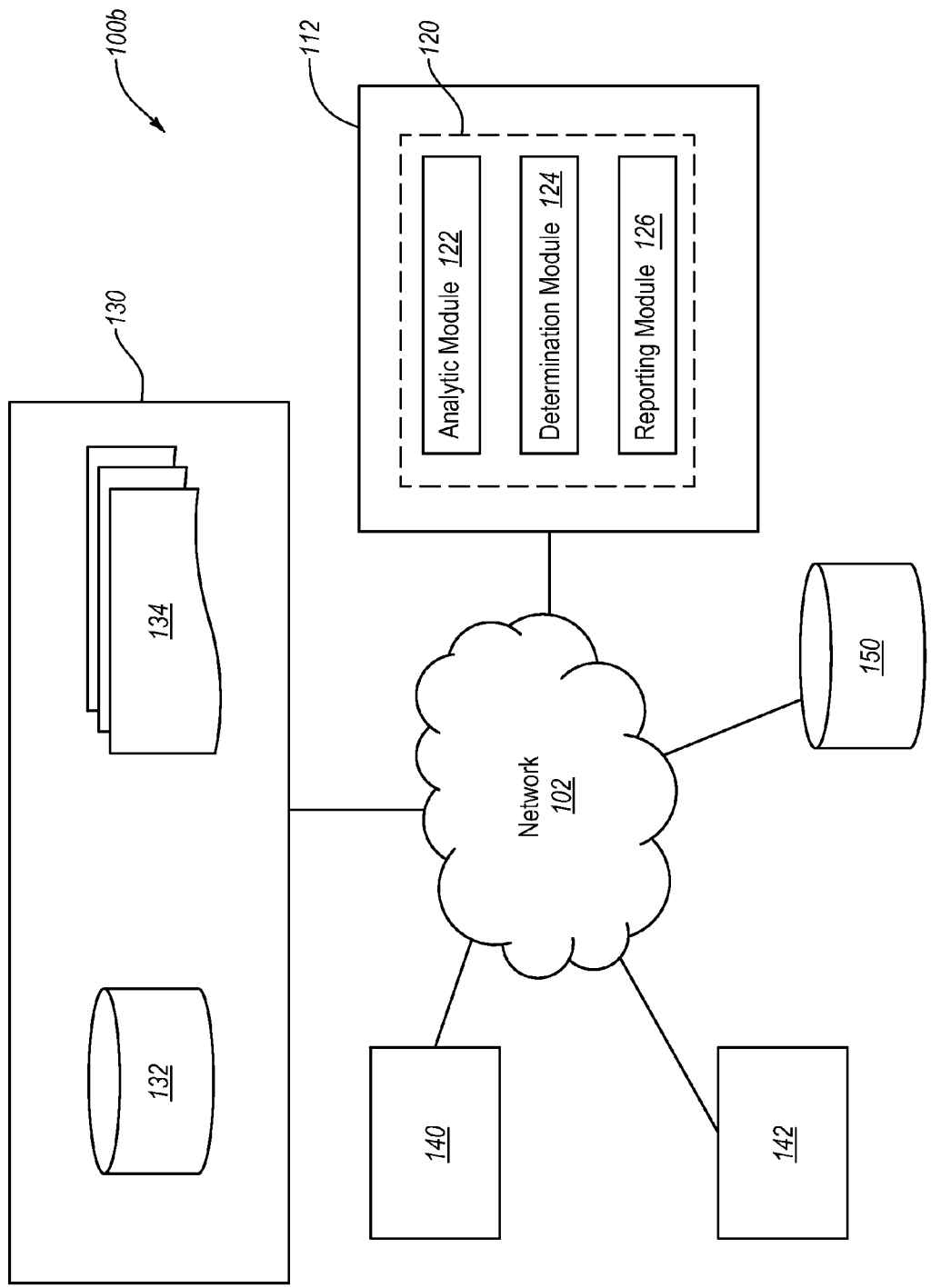
FIG. 1B is a block diagram of another example SEO system.

FIG. 1B is a block diagram of another example SEO system 100b, arranged in accordance with at least some embodiments described herein. The SEO system 100b may include the network 102. In some embodiments, the network 102 may operably couple the SEO module 112, a search result computing system 130, first and second servers 140, 142, and a search term database 150. It will be appreciated that while these components are shown as separate, the components may be combined as desired. Further, while one of each component is illustrated, the system 100b may optionally include any number of each of the illustrated components.

The SEO module 112 may include an SEO computing system 120 configured to perform SEO analysis and produce recommendations as described herein. The SEO computing system 120 may include submodules for implementing particular functionalities. The SEO computing system 120 may be generic to and include an analytic module 122, a determination module 124, and a reporting module 126.

The search result computing system 130 may include a search results database 132 that may store one or more search results 134, such as digital content related to an entity that may include webpages from websites and other digital content as previously discussed. Alternatively or additionally, the search results database 132 may also store SEO data collected from the one or more search results 134.

The search results computing system 130 may obtain the search results 134 by initiating a category independent search to be performed by a search engine using one or more search terms found in the search term database 150 and either the first or the second server 140, 142 or both.

In some embodiments, the search results obtained from a search engine may vary according to previous searches performed by a user. For example, in some embodiments, a search engine may consider a profile of a user when generating the search results. In some embodiments, the profile of a user may be based on a previous search history occurring at the same IP address or MAC address. For example, the profile of a user may be based on a previous search history of the user as determined by cookies or other digital information stored on an electronic device that the user utilizes to perform searches. In some embodiments, the profile of a user may be based on a previous search history stored on a server. For example, a user may be registered with a search engine and the search engine may store a history of the searches of the user. In some embodiments, the profile of a user may be based on the previous search history of the user generated during a current search session. For example, if a user performed a first search and then performed a second search related to the first search based on the results from the first search, the results generated by the search engine for the second search may be based on the first search performed by the user.

In some embodiments, when considering a profile of a user, the search engine may consider different factors of a search history of the user. In some embodiments, the search engine may consider previous locations where searches have occurred. For example, if a user had performed a first search for pizza places in San Antonio Tex. and then the user performed a second search for pizza places, the search engine may generate search results with pizza places in San Antonio Tex. ranked higher than pizza places in other locations based on the first search of the user. In some embodiments, the search engine may consider previous digital content visited by the user. In some embodiments, the search engine may consider previous digital content, such as a website or webpages, where a user purchased a product. Numerous other factors within a profile may also be considered by a search engine.

In some embodiments, the search results obtained from the search engine may vary according to previous social actions performed by a user. For example, in some embodiments, a search engine may consider whether a user has acknowledged a website or webpage using social media when generating the search results. In some embodiments, a user may acknowledge digital content using social media by indicating that the user likes the digital content, by linking the digital content to a page of a social media site managed by the user, or by sending a link to the digital content to other users of social media.

The search results 134 from a category independent search, comprising category and non-category specific search results as well as sub-links of the non-category specific search results, may be accessed by way of the first server 140, the second server 142, or both depending on which of the first or second servers 140, 142 was used to conduct the search. In some embodiments, the first and second servers 140, 142 may be located in geographically distinct locations. In some embodiments, the first and second servers 140, 142 may be in the same relative locations, or in the same location.

The SEO data of the search results 134 may be collected by crawling the search results 134. In some embodiments, the search results 134 may be crawled using a deep index engine, such as the deep index engine 108 of FIG. 1A. In some embodiments, the search results 134 may be crawled using a different mechanism.

Referring again to the SEO computing module 120, the analytic module 122 may be configured to analyze the SEO data for each of the search results 134. The analytic module 122 may include one or more algorithms for analyzing the SEO data from the search results 134. For example, the analytic module 122 may analyze SEO data from each of the search results 134 to determine if a search result 134 contains category specific content or non-category specific content. Alternately or additionally, the analytic module 122 may analyze the SEO data of search results to determine if the non-category specific content includes sub-links. Alternately or additionally, the analytic module 122 may analyze the SEO data of search results that contain category specific content to determine the exact category of the content. For example, the analytic module 122 may determine if the search result is news, places, video, or other digital content.

Alternately or additionally, the analytic module 122 may analyze the SEO data to determine if digital content within the search results relate to a specific entity. Alternately or additionally, the analytic module 122 may also analyze the SEO data of the search results 134 to determine a position of the digital content related to the entity with respect to category specific search results, non-category specific results, and/or sub-links of non-category specific results.

In some embodiments, the digital content related to the entity may be category specific search results, non-category specific search results, and/or sub-links of non-category specific search results.

The determination module 124 may obtain data from the analytic module 122, and may be configured to determine a position of digital content related to an entity with respect to non-category specific search results and sub-links of non-category specific search results. Alternately or additionally, the determination module 124 may be configured to determine a position of digital content related to an entity with respect to non-category specific search results, sub-links of non-category specific search results, and category specific search results. Alternately or additionally, the determination module 124 may be configured to determine a first position of digital content related to an entity with respect to a subset of the search results and a second position of the digital content related to the entity with respect to the search results.

The determination module 124 may include one or more algorithms for processing the data obtained from the analytic module 122. For example, using the data provided by the analytic module 122, the determination module 124 may account for different presentations of the search results to a user when determining a position of digital content related to an entity. Alternately or additionally, the determination module 124 may account for category specific search results orientated differently than non-category specific search results when determining a position of digital content related to an entity. Alternately or additionally, using the determination module 124 may account for the category of category specific search results in the search results when determining a position of digital content related to an entity. For example, the determination module 124 may exclude news results when determining the position of the digital content related to the entity.

The reporting module 126 may compile information from the analytic module 122, the determination module 124, or both to generate a report and/or make recommendations to improve SEO performance of digital content related to the entity. The reporting module 126 may include one or more algorithms that may generate one or more reports and provide one or more recommendations for improved SEO performance of digital content of an entity.

Figure 2:
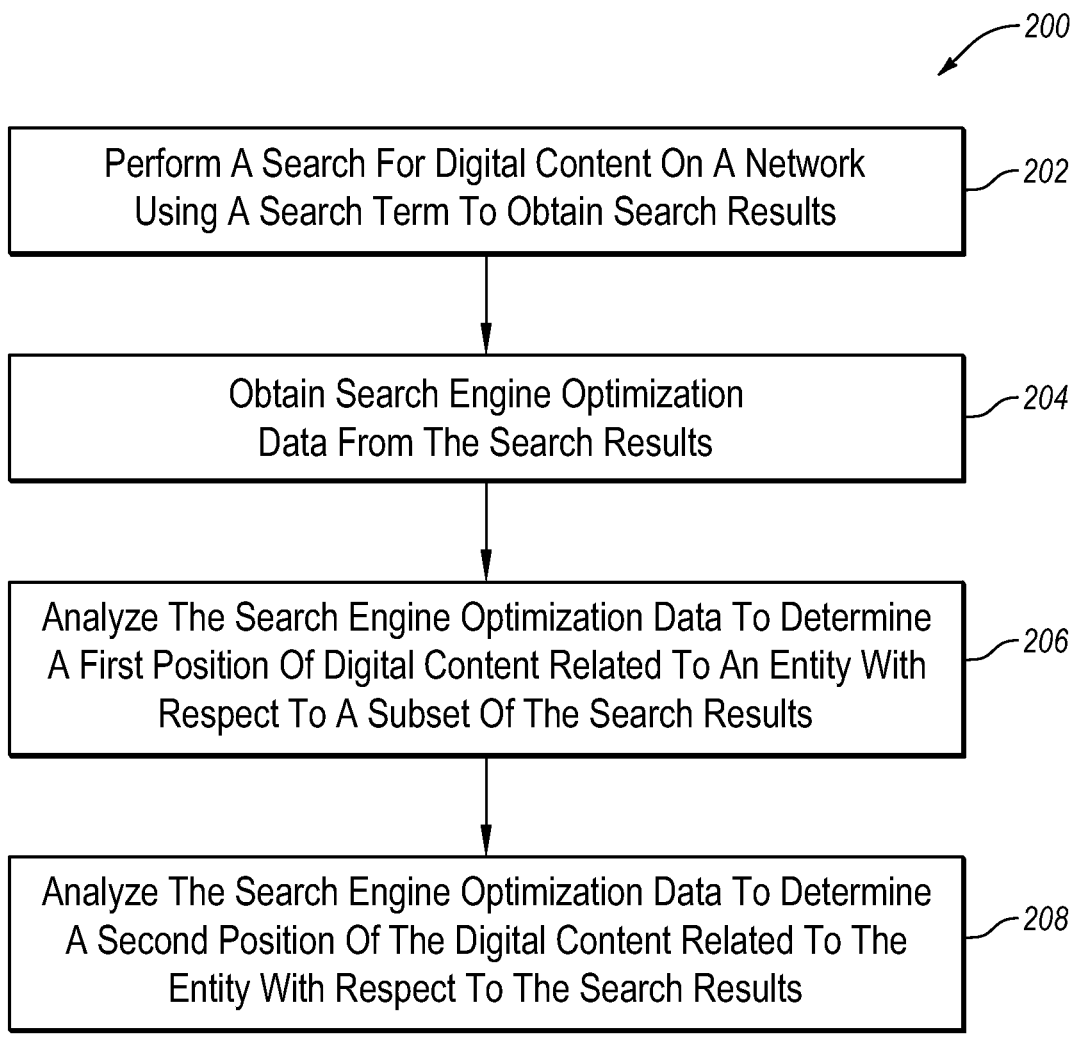
FIG. 2 is a flow chart of an example method of determining search engine rank for digital content.

FIG. 2 is a flow chart of an example method 200 of determining search engine rank for digital content, arranged in accordance with at least some embodiments described herein. The method 200 may be implemented, in some embodiments, by a SEO system, such as the SEO system 100b of FIG. 1B. For instance, the SEO module 112 within the SEO system 100B of FIG. 1B may be configured to execute computer instructions to cause the SEO system 100b to perform operations for determining search engine rank for digital content as represented by one or more of blocks 202, 204, 206, and 208 of the method 200. Although illustrated as discrete blocks, various blocks may be divided into additional blocks, combined into fewer blocks, or eliminated, depending on the desired implementation.

The method 200 may begin at block 202, in which a search may be performed for digital content on a network using a search term to obtain search results. For example, in some embodiments, a search may be performed on the internet using a search term, such as shoes. The search may be performed using a search engine and may produce various types of search results. For example, the search results may include category specific search results and/or non-category specific search results. Alternately or additionally, the search results may include non-category specific search results and/or sub-links of the non-category specific search results. Alternately or additionally, the search results may include non-category specific search results, sub-links of the non-category specific search results, and/or category specific search results.

In some embodiments, the category specific search results may be within one of the following categories of digital content: images, videos, news, shopping, blogs, books, places, discussions, and/or recipes.

At block 204, search engine optimization data may be obtained from the search results. The search results may be digital content, such as a website, webpage, blog, email, image, video, or some other digital content. In some embodiments, the search results may be crawled to obtain the search engine optimization data. For example, the search results may be crawled by a deep index engine, such as the deep index engine 108 of FIG. 1A. The search engine optimization data obtained from the search results may include a pixel position on a search engine result page where a search result is located; whether the search results is a non-category specific search result, a sub-link of a non-category specific search result, or a category specific search result; content in the search result, such as, references to entities related to the search result, products related to the search result, among other content; and other data.

At block 206, the search engine optimization data is analyzed to determine a first position of digital content related to an entity with respect to a subset of the search results. In some embodiments, the subset of the search results may include non-category specific search results. In these and other embodiments, the first position of the digital content may be determined with respect to non-category specific search results and other search results, such as sub-links and non-category specific search results, may not be considered. The first position of the digital content may be determined with respect to the other non-category specific search results on the search engine result page.

To determine the first position of the digital content, the arrangement of the non-category specific search results may be determined. In some embodiments, the search results may be arranged in one or more sequences on a search engine result page. For example, in some embodiments, the non-category specific search results may be arranged vertically. In this configuration, the search result in a highest position is located at or near the top of the search result page. The search results of descending order may be located sequentially beneath the highest search result. In some embodiments, the search results may be arranged horizontally. In this configuration, the search result in a highest or first position is located at or near the left hand of the search result page. The search results of descending order are located sequentially to the right of the highest search result. In some embodiments, the non-category specific search results may be arranged in a grid type pattern, with the search result in a highest or first position located at or near the top left hand of the page. The search results of descending order are located sequentially to the right of the highest ranked search result until the search results reach the right hand of the page. The results then wrap around and form a second row of search results.

Figure 4:
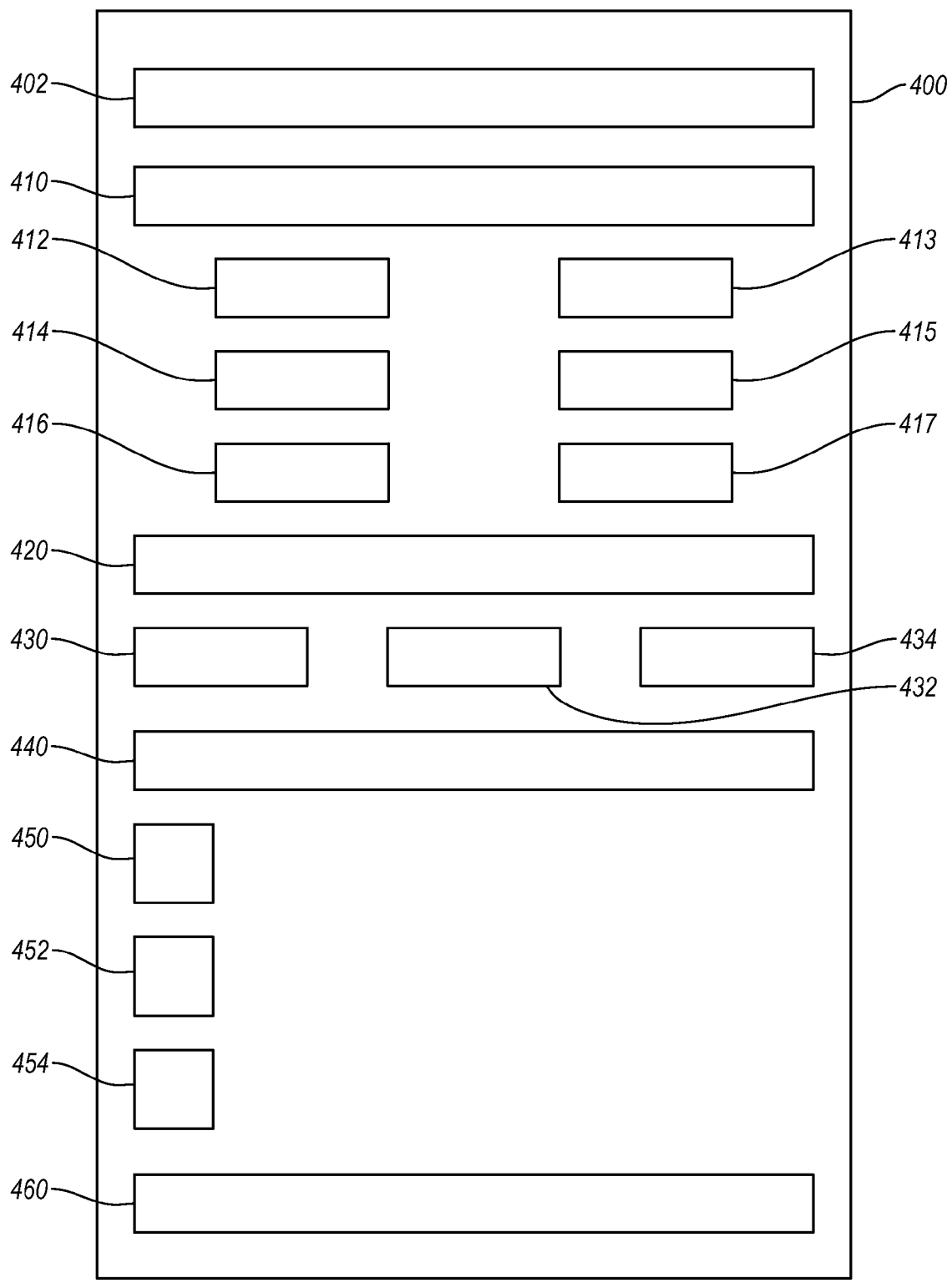
FIG. 4 illustrates an example search engine result page.

In some embodiments, a search engine result page may have a combination of arrangements of search results. For example, FIG. 4 illustrates a search engine result page with a combination of arrangements of search results.

After the arrangement of the search results is determined, the first position of the digital content may be determined with respect to the other non-category specific search results on the search engine result page. For example, if the digital content is located in a second highest position in the arrangement of non-category specific search results, the first position of the digital content may be the second highest position in the search engine result page.

At block 208, the search engine optimization data may be analyzed to determine a second position of the digital content related to the entity with respect to the search results. The search results may include non-category specific search results, category specific results, and sub-links to non-category specific search results. The second position of the digital content may be determined with respect to the search results on the search engine result page. To determine the second position of the digital content, the arrangement of the search results may be determined. The search results may be arranged vertically, horizontally, in a grid pattern, or in some combination thereof. After determining the arrangement of the search results, the second position of the digital content related to the entity with respect to the search results that include the non-category specific search results, category specific results, and sub-links may be determined.

In some embodiments, some categories of category specific search results may not be considered when analyzing the search results to determine either the first or second positions or both. In some embodiments, a category of specific results not considered may be search results within the news category because specific results in the new category may be constantly changing and may not provide an accurate reflection of the position digital content related to an entity has on a search engine result page.

In some embodiments, determining the first and second positions of digital content may account for different presentations of the search results to a user. For example, the presentation of the search results may vary depending on the type of device that displays the search results. A display for a desktop type computer may be larger than a display for a notebook, netbook, or tablet. Similarly, a display for a notebook may be larger than a display for a netbook or tablet. Furthermore, a display for a netbook or tablet may be larger than a display for smaller electronic devices, such as mobile phones, PDAs, gaming consoles, and other smaller electronic devices. The size of the display may affect the number of non-category and category specific search results that are displayed to a user as well as the number of sub-links displayed to a user.

In some embodiments, when a search result is displayed on some but not all devices then it may not be considered when determining a position of digital content related to an entity. In other embodiments, the search displayed on some but not all devices may be considered when determining a position of digital content related to an entity. When the digital content related to the entity is displayed on some but not all devices, the position of the digital content may be marked to indicate that the position of the digital content is dependent on the display upon which the search results are displayed.

In some embodiments, the position of the digital content may be referred to as the rank of the digital content on a search engine result page.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 200 may further include determining if the performed search should be performed from a geographic location that is different from the geographic locations where a search has already been performed. An additional search based on geographic location may be beneficial, desired, or both, depending on one or more factors. One factor may include the type of category search results that the search term produces. Different types of category search results may vary more depending on the location where the search was performed. For example, digital content in the places category may vary more than other digital content since it is more specific to the location where the search was performed.

Another factor may include the geographic locations of the markets for which the search terms are targeted. For example, if the search terms are directed toward a restaurant located in one geographic location then it may not be beneficial to perform the search from a different geographic location. Alternatively, if the search terms are directed toward a chain restaurant with locations throughout a country of sufficient size that localization occurs within the country then it may be beneficial to perform the search in multiple geographic locations. Alternatively, if the search terms are directed toward a chain restaurant with locations in more than one country then it may be beneficial to perform the search in multiple geographic locations to account for the different country's geographic locations regardless of the size of the countries.

Another factor may include the types of devices on which the search is performed. For example, smaller hand held devices, such as mobile phones, PDAs, tablets, and others may produce more localized search results than results produced using a personal computer. Thus, if the search terms are more likely to be used on a smaller hand held device then it may be beneficial to perform the search in multiple geographic locations.

In embodiments when it is determined that an additional search should be performed from a different geographic location, a server in a different geographic location may be located and blocks 202, 204, 206, and 208 may be repeated. When one or more search is performed, the first and second positions may be determined by lumping the searches together. In some embodiments, the first and second positions from each search may be determined independently and then may be combined to form final first and second positions.

The method 200 may also include generating a report indicating the first position and the second position of the digital content related to the entity. The report may be used by the entity to understand how to perform search engine optimization for the digital content or other digital content related to the entity. For example, entities that produce digital content for a network, such as websites and other digital content, may embedded or associate search terms, commonly referred to as keywords, with their digital content to increase the SEO of the digital content. It may be beneficial to entities that use these search terms to know the positions of their digital content on search engine result pages for various search terms to understand (1) what type of digital content to produce; (2) how to better optimize the digital content they contain; (3) how category digital content, non-category digital content, or both produced by the entity or others is affecting other digital content; and (4) other information. It may also be beneficial to entities that use these search terms to know how their digital content is positioned on search engine result pages so that the entity is aware of (1) what digital content may need more SEO; (2) what type of digital content is achieving better placement on search engine result pages; (3) SEO data that achieves better placement on search engine result pages; and (4) other information. It may also be beneficial for entities to understand how much of their digital content is appearing on search result pages to determine how well they are saturating a search engine result page.

In some embodiments, the search performed during the method 200 may be performed on a personal computer. Alternately or additionally, the search performed during the method 200 may be performed on another electronic device, such as, a mobile phone, tablet, notebook computer, PDA, gaming console, or some other electronic device. In some embodiments, the search performed on different devices may produce different sets of search results. In these and other embodiments, the different sets of search results may be obtained and a first position of digital content related to an entity with respect to a subset of each of the different sets of search results may be determined. Alternately or additionally, a second position of digital content related to an entity with respect to each of the different sets of search results may be determined.

Figure 3:
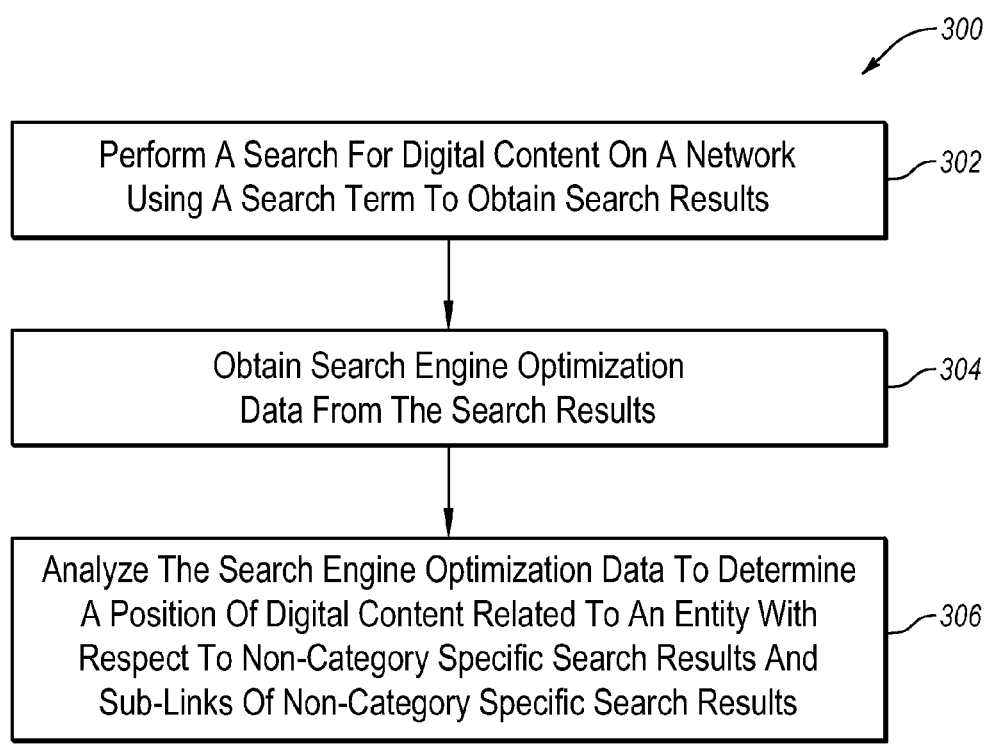
FIG. 3 is a flow chart of another example method of determining search engine rank for digital content.

FIG. 3 is a flow chart of an example method 300 of determining search engine rank for digital content, arranged in accordance with at least some embodiments described herein. The method 300 may be implemented, in some embodiments, by a SEO system, such as the SEO system 100b of FIG. 1B. For instance, the SEO module 112 within the SEO system 100B of FIG. 1B may be configured to execute computer instructions to cause the SEO system 100b to perform operations for determining search engine rank for digital content as represented by one or more of blocks 302, 304, and 306 of the method 300. Although illustrated as discrete blocks, various blocks may be divided into additional blocks, combined into fewer blocks, or eliminated, depending on the desired implementation The method 300 may begin at block 302 where a search may be performed for digital content on a network using a search term to obtain search results. For example, in some embodiments, a search may be performed on the internet using a search term, such as shoes. The search may be performed using a search engine and may produce various types of search results. For example, the search results may include category specific search results and/or non-category specific search results. Alternately or additionally, the search results may include non-category specific search results and/or sub-links of the non-category specific search results. Alternately or additionally, the search results may include non-category specific search results, sub-links of the non-category specific search results, and/or category specific search results.

In some embodiments, the category specific search results may be within one of the following categories of digital content: images, videos, news, shopping, blogs, books, places, discussions, and recipes.

At block 304, search engine optimization data may be obtained from the search results. The search results may be digital content, such as a website, webpage, blog, email, image, video, or some other digital content. In some embodiments, the search results may be crawled to obtain the search engine optimization data. For example, the search results may be crawled by a deep index engine, such as the deep index engine 108 of FIG. 1A. The search engine optimization data obtained from the search results may include a pixel position on a search engine result page where a search result is located; whether the search results is a non-category specific search result, a sub-link of a non-category specific search result, or a category specific search result; content in the search result, such as, references to entities related to the search result, products related to the search result, among other content; and other data.

At block 306, the search engine optimization data may be analyzed to determine a position of digital content related to an entity with respect to non-category specific search results and sub-links of non-category specific search results. In some embodiments, the search engine optimization data may be analyzed to determine a position of digital content related to an entity with respect to non-category specific search results, sub-links of non-category specific search results, and/or category specific search results. To determine the position of the digital content, the arrangement of the search results may be determined.

In some embodiments, determining the position of the digital content may account for different presentations of the search results to a user. Alternately or additionally, some categories of category specific search results may not be considered when analyzing the search results to determine the position. In some embodiments, a category of specific results not considered may be search results within the news category. Alternately or additionally, the position of the digital content may be referred to as the rank of the digital content on a search engine result page. Alternately or additionally, when the position of the digital content is determined, category specific search results being arranged differently than non-category specific search results may be accounted for. For example, in some embodiments, the category specific search results may be arranged horizontally while the non-category specific search results may be arranged vertically. Having different arrangements for the category or non-category specific search results, may result in a different position for the digital content related to the entity.

In some embodiments, the method 300 may further include determining if the performed search should be performed from a geographic location that is different from the geographic locations where a search has already been performed. In some embodiments, the method 300 may further include generating a report indicating the first position and the second position of the digital content related to the entity.

In some embodiments, the search performed during the method 300 may be performed on a personal computer. Alternately or additionally, the search performed during the method 300 may be performed on another electronic device, such as, a mobile phone, tablet, notebook computer, PDA, gaming console, or some other electronic device. In some embodiments, the search performed on different devices may produce different sets of search results. In these and other embodiments, the different sets of search results may be obtained and a position of digital content related to the entity for non-category specific search results, sub-links of non-category specific search results, and/or category specific search results, may be determined for each of the different sets of search results.

FIG. 4 illustrates an example search engine result page 400, arranged in accordance with at least some embodiments described herein. The search engine result page 400 may include non-category specific search results 402, 410, 420, 440, 460, sub-links 412, 413, 414, 415, 416, 417 of non-category specific search result 410, and category specific search results 430, 432, 434, 450, 452, 454.

Based on the arrangement illustrated in FIG. 4, the non-category specific search result 402 may have the highest position on the search engine result page 400 and the non-category specific search result 460 may have the lowest position.

An example follows of analyzing search engine optimization data to determine a first position of digital content related to an entity with respect to a subset of the search results and a second position of digital content related to an entity with respect to the search results based on the search engine result page 400. Assuming the non-category specific search result 420 is the digital content related to the entity and the subset of search results is the non-category specific search results 402, 410, 420, 440, 460, the first position of the digital content related to the entity (i.e. the non-category specific search result 420) may be in the third highest position on the search engine result page 400. The first position of the digital content may be in the third highest position because the sub-links 412, 413, 414, 415, 416, 417 of non-category specific search result 410 may not be considered because they are not within the subset of non-category specific search results 402, 410, 420, 440, 460.

The second position of the digital content related to the entity (i.e. the non-category specific search result 420) may be in the ninth highest position on the search engine result page 400. When all the search results are considered, non-category specific search results 402, 410 may be in the first and second highest positions, sub-link 412 may be in the third highest position, sub-link 413 may be in the fourth highest position, sub-link 414 may be in the fifth highest position, sub-link 415 may be in the sixth highest position, sub-link 416 may be in the seventh highest position, sub-link 417 may be in the eighth highest position, making non-category specific search result 420 the ninth highest position on the search engine result page 400.

Another example follows of analyzing search results to determine a position of digital content related to an entity with respect to non-category specific search results, category specific search results, and sub-links of non-category specific search results based on the search engine result page 400. Assuming the category specific search result 452 is the digital content related to the entity, in some embodiments, the digital content related to the entity may have the thirteenth highest position. With all the search results considered, non-category specific search results 402, 410 may be in the first and second highest positions, sub-links 412, 413, 414, 415, 416, 417, may be in the third through eighth highest positions, non-category specific search result 420 may be in the ninth highest position, category specific search result 430 may be in the tenth highest position, category specific search results 432, 434 may not be given positions because they are arranged in a horizontal fashion with respect to other category specific search results, non-category specific search result 440 may be in the eleventh highest position, category specific search results 450 may be in the twelfth highest position, making the category specific search result 452 in the thirteenth highest position.

In some embodiments, the category specific search results 432, 434 may be given position ranks. In these and other embodiments, the category specific search result 452 may be in the fifteenth highest position.

FIG. 5 illustrates an example of a screen shot of a dashboard 500, arranged in accordance with at least some embodiments described herein. The dash may display information about search results produced by the entity's search terms. More specifically, the dashboard 500 may include a chart 510. The chart 510 may include a plurality of search terms. For each of the search terms, the chart 510 may indicate a first position of digital content related to an entity that results from a search using the respective search term. For each of the search terms, the chart 510 may also indicate a second position of digital content related to an entity that results from a search using the respective search term. The chart 510 may also indicate for each search term, a change in the first and second positions, the category of the digital content related to the entity that results from a search using each search term, the search volume for each search term, and the digital content that results from a search for each search term. The chart 510 may also indicate the search engine rank page SERP for each search term.

Some embodiments described herein include a computer program product having computer-executable instructions for causing a computing system having the computer program product to perform a computing method of the computer-executable instructions for increasing SEO performance of digital content. The computing method may be any method described herein as performed by a computing system. The computer program product may be located on a computer memory device, which may be removable or integrated with the computing system.

Some embodiments described herein include a computing system capable of performing the methods described herein. As such, the computing system may include a memory device that has the computer-executable instructions for performing the method.

In some embodiments, a computing device, such as a computer or memory device of a computer, may include a determination module and a reporting module. The determination module and reporting module may be configured to perform any of the methods described herein. In addition, the determination module and reporting module may be combined into a single module or on a single platform. In some embodiments, a computer program product may include one or more algorithms for performing any of the methods of any of the claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein could implement the functionalities associated with the name of the module or component.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for describing particular embodiments only, and is not intended to be limiting.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
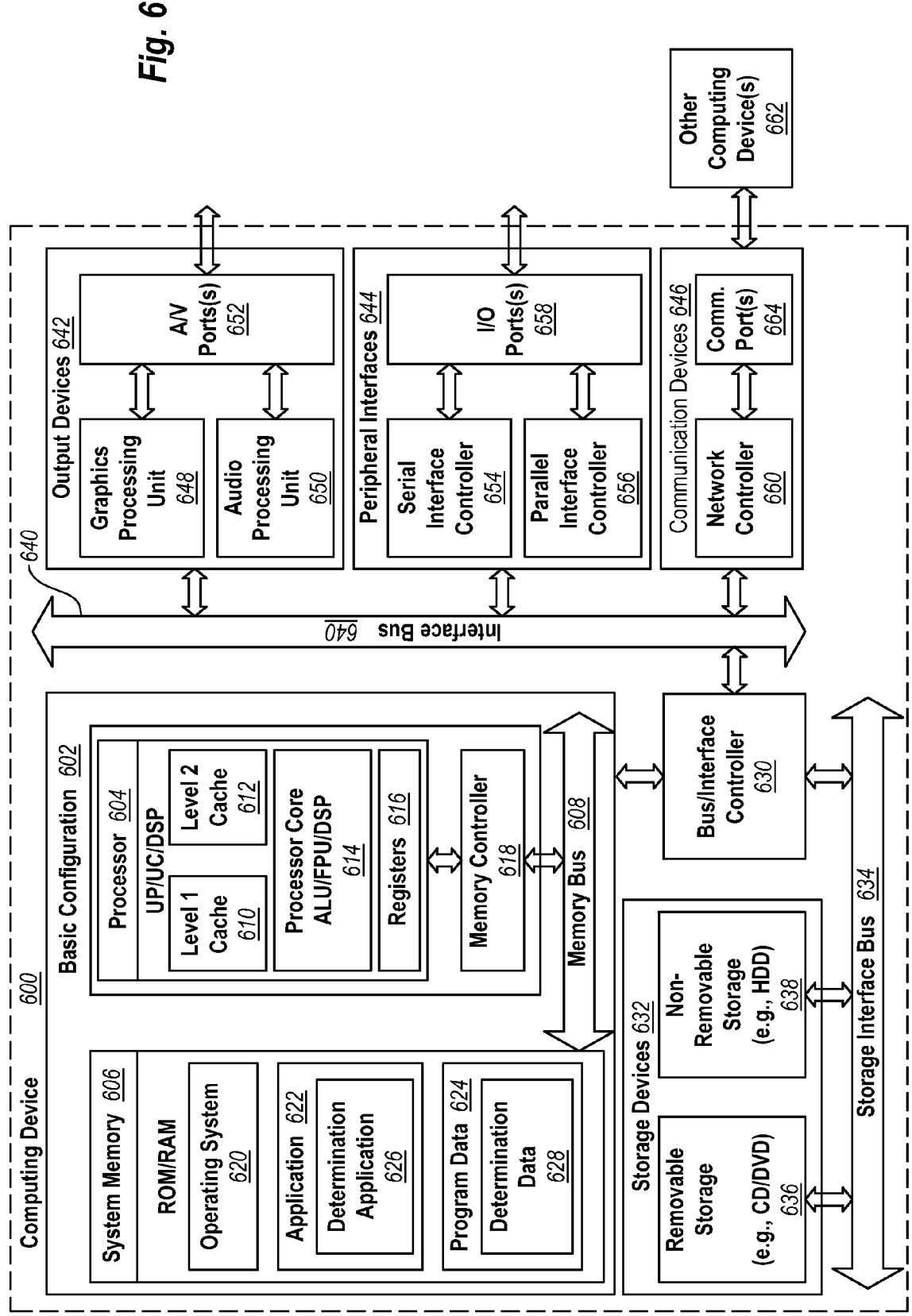
FIG. 6 is a block diagram of an example computing device configured to implement some embodiments described herein, are all arranged in accordance with at least one of the embodiments described herein.

FIG. 6 is a block diagram of an example computing device 600 configured to implement some embodiments described herein, arranged in accordance with at least some embodiments described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating-point unit (FPU), a digital signal-processing core (DSP Core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. The determination application 626 may correspond to the determination module 124 of FIG. 1B, for example. Program Data 624 may include determination data 628 that may be useful for analyzing SEO data to identify category specific search results, non-category specific results, sub-links, and other information of search results. In some embodiments, application 622 may be arranged to operate with program data 624 on operating system 620.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 may also be any type of network computing device. The computing device 600 may also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method of determining a search engine rank for digital content, the method comprising:
   obtaining a search engine results page with search results from a search engine based on a search for digital content on a network using one or more search terms, the search results including two or more of: category specific search results, non-category specific search results, and sub-links of the non-category specific search results;
   obtaining data from the search results;
   analyzing the data to identify an arrangement of the search results on the search engine results page;
   analyzing, using hardware, the data to determine a first position of digital content related to an entity with respect to a subset of the search results based on the arrangement of the search results,
      wherein the digital content is one of the category specific search results or one of the non-category specific search results, and
      the subset of the search results includes one or more of the two or more of: the category specific search results, the non-category specific search results, and the sub-links of the non-category specific search results included in the search results; and
   analyzing the data to determine a second position of the digital content related to the entity with respect to the search results on the search engine results page based on the arrangement of the search results.

2. The method of claim 1, wherein the category specific search results are within one of the following categories of digital content: images, videos, news, shopping, blogs, books, places, discussions, and recipes.

3. The method of claim 1, wherein the sub-links of each of the non-category specific search results includes a link to digital content within a web domain that is linked to by the respective non-category specific search result of the sub-links.

4. The method of claim 1, wherein the subset of the search results includes non-category specific search results.

5. The method of claim 1, further comprising generating a report indicating the first position and the second position of the digital content related to the entity.

6. The method of claim 1, wherein the analyzing the data to determine the first and second positions of digital content accounts for different presentations of the search results to a user.

7. The method of claim 1, wherein the search is performed using a handheld device or a personal computer.

8. The method of claim 7, wherein the search results produced from the search performed using the handheld device are different from the search results produced from the search performed using the personal computer.

9. The method of claim 1, wherein the search is performed using a handheld device.

10. The method of claim 9, further comprising:
   obtaining a second search engine results page with second search results from the search engine based on a second search performed using a personal computer;

obtaining data from the second search results;
analyzing the data to determine a third position of the digital content related to the entity with respect to a subset of the second search results; and
analyzing the data to determine a fourth position of the digital content related to the entity with respect to the second search results.

11. The method of claim 7, wherein the handheld device is a mobile phone, tablet, PDA, or gaming console.

12. The method of claim 10, further comprising generating a report that illustrates the first, second, third, and fourth positions for the digital content related to the entity.

13. A method of determining a search engine rank for digital content, the method comprising:
obtaining a search engine results page with search results from a search engine based on a search for digital content on a network using one or more search terms, the search results including non-category specific search results and sub-links of the non-category specific search results;
obtaining data from the search results;
analyzing the data to identify an arrangement of the search results on the search engine results page; and
analyzing, using hardware, the data to determine a rank of digital content related to an entity based on the arrangement and a number of the non-category specific search results and the sub-links of the non-category specific search results.

14. The method of claim 13, wherein the search results include category specific search results.

15. The method of claim 14, wherein the category specific search results are within one of the following categories of digital content: images, videos, news, shopping, blogs, books, places, discussions, and recipes.

16. The method of claim 14, wherein the analyzing the data to determine the rank of the digital content related to the entity is based on the arrangement, the number of the non-category specific search resultsand the sub-links of the non-category specific search results, and a number of the category specific search results.

17. The method of claim 10, wherein the analyzing the data to determine the rank of the digital content accounts for the category specific search results being orientated differently than the non-category specific search results.

18. The method of claim 13, wherein the search is performed using a handheld device or a personal computer.

19. The method of claim 18, wherein the search results produced from the search performed using the handheld device are different from the search results produced from the search performed using the personal computer.

20. A non-transitory computer-readable medium encoded with a computer program having computer-executable instructions for causing a computing system to perform operations to determine a search engine rank for digital content, the operations comprising:
obtaining a search engine results page with search results from a search engine based on a search for digital content on a network using one or more search terms, the search results including non-category specific search results and sub-links of the non-category specific search results;
obtaining data from the search results;
analyzing the data to identify an arrangement of the search results on the search engine results page; and
analyzing, using hardware, the data to determine a rank of digital content related to an entity based on the arrangement and a number of the non-category specific search results and the sub-links of the non-category specific search results.

21. The computer-readable medium of claim 20, wherein the search results include category specific search results.

22. The computer-readable medium of claim 21, wherein the category specific search results are within one of the following categories of digital content: images, videos, news, shopping, blogs, books, places, discussions, and recipes.

23. The computer-readable medium of claim 20, wherein the search is performed using a handheld device or a personal computer.

24. The computer-readable medium of claim 23, wherein the search results produced from the search performed using the handheld device are different from the search results produced from the search performed using the personal computer.

25. The computer-readable medium of claim 20, wherein the analyzing the data to determine the rank of the digital content related to the entity is based on the arrangement, the number of the non-category specific search results and the sub-links of the non-category specific search results, and a number of the category specific search results.

26. The computer-readable medium of claim 25, wherein the analyzing the data to determine the rank of the digital content related to the entity accounts for the category specific search results being orientated differently than the non-category specific search results.

* * * * *